United States Patent
Roberts et al.

(10) Patent No.: US 9,552,929 B2
(45) Date of Patent: Jan. 24, 2017

(54) POLYMER-NANOCARBON COMPOSITES, METHODS OF MAKING COMPOSITES, AND ENERGY STORAGE DEVICES INCLUDING THE COMPOSITE

(71) Applicant: Clemson University, Clemson, SC (US)

(72) Inventors: Mark E. Roberts, Clemson, SC (US); Apparao M. Rao, Anderson, SC (US); Ramakrishna Podila, Central, SC (US); Robert Emmett, Raleigh, NC (US)

(73) Assignee: CLEMSON UNIVERSITY, Clemson, SC (US)

( * ) Notice: Subject to any disclaimer, the term of this patent is extended or adjusted under 35 U.S.C. 154(b) by 205 days.

(21) Appl. No.: 14/331,264

(22) Filed: Jul. 15, 2014

(65) Prior Publication Data
US 2015/0017528 A1    Jan. 15, 2015

Related U.S. Application Data

(60) Provisional application No. 61/846,209, filed on Jul. 15, 2013.

(51) Int. Cl.
| | |
|---|---|
| *H01M 4/13* | (2010.01) |
| *H01G 11/36* | (2013.01) |
| *H01G 11/68* | (2013.01) |
| *H01M 4/36* | (2006.01) |
| *H01M 4/60* | (2006.01) |
| *H01M 4/583* | (2010.01) |
| *H01M 4/66* | (2006.01) |
| *H01G 11/02* | (2013.01) |
| *H01G 11/84* | (2013.01) |

(52) U.S. Cl.
CPC .............. *H01G 11/36* (2013.01); *H01G 11/02* (2013.01); *H01G 11/68* (2013.01); *H01G 11/84* (2013.01); *H01M 4/366* (2013.01); *H01M 4/583* (2013.01); *H01M 4/602* (2013.01); *H01M 4/661* (2013.01); *Y02E 60/13* (2013.01)

(58) Field of Classification Search
CPC ...... H01M 4/366; H01M 4/602; H01M 4/583; H01M 4/661
See application file for complete search history.

(56) References Cited

U.S. PATENT DOCUMENTS

2003/0143453 A1*  7/2003  Ren .................. B82Y 10/00
                                                 429/209

* cited by examiner

*Primary Examiner* — Jane Rhee
(74) *Attorney, Agent, or Firm* — Thomas Horstemeyer, LLP

(57) ABSTRACT

Embodiments of the present disclosure, in one aspect, relate to composites including a carbon nanomaterial having a redox-active material, such as a polymer containing redox groups, disposed on the carbon nanomaterial, methods of making the composite, methods of storing energy, and the like.

21 Claims, 10 Drawing Sheets

POLYMER-NANOCARBON COMPOSITES, METHODS OF MAKING COMPOSITES, AND ENERGY STORAGE DEVICES INCLUDING THE COMPOSITE

CROSS-REFERENCE TO RELATED APPLICATION

This application claims priority to U.S. provisional application entitled "POLYMER-NANOCARBON COMPOSITES, METHODS OF MAKING COMPOSITES, AND ENERGY STORAGE DEVICES INCLUDING THE COMPOSITE," having Ser. No. 61/846,209, filed on Jul. 15, 2013, which is entirely incorporated herein by reference.

STATEMENT OF GOVERNMENT SPONSORSHIP

This invention was made with Government support under Contract/Grant No. 1246800, awarded by the National Science Foundation. The Government has certain rights in this invention.

BACKGROUND

Electrochemical capacitors, also referred to as supercapacitors, function as "fast batteries" by supplying high amounts electrical energy on short time scales, with rapid switching speeds, and long-term cycle stability. Supercapacitors have been proposed to bridge the gap between batteries and capacitors by incorporating elements of both technologies. Carbon is attractive due to its chemical and thermal stability; however, the maximum attainable gravimetric capacitance is around 150-200 F/g in aqueous electrolytes and 120-150 F/g in non-aqueous electrolytes. In these systems, charge is stored by a purely physical mechanism at the interface of inert carbon electrodes within the so-called "electrical double-layer" and is fundamentally limited by surface area. Compared to batteries, which store charge through chemical reactions within the electrode, supercapacitors suffer from low energy density or charge capacity. In light of the current need for higher energy and power densities, there is a need for technologies and materials that can overcome the existing limitations of pure carbon capacitors.

SUMMARY

Embodiments of the present disclosure provide composites including a carbon nanomaterial having a redox-active material, such as a polymer containing redox groups, disposed on the carbon nanomaterial, methods of making the composite, methods of storing energy, and the like.

An exemplary embodiment provides for a composite, among others, that include a carbon nanomaterial having a redox material or polymer coated on a portion of the carbon nanomaterial.

An exemplary embodiment provides for a method of making a composite, among others, that include: chemically growing, coating, spreading, or spray coating a carbon nanomaterial directly on a current collector, wherein the carbon nanomaterial includes a redox material or redox polymer coated on a portion of the carbon nanomaterial An exemplary embodiment provides for an energy storage device, among others, that include at least one carbon nanomaterial having a redox polymer coated on a portion of the carbon nanomaterial.

Other structures, methods, features, and advantages of the present disclosure will be, or become, apparent to one with skill in the art upon examination of the following drawings and detailed description. It is intended that all such additional structures, methods, features, and advantages be included within this description, be within the scope of the present disclosure, and be protected by the accompanying claims.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 6A illustrates single Single electrode capacitance vs. voltage characteristics for 0.5 $cm^2$ MWCNT electrodes, A) with varying electrode mass without polymer. FIG. 6B illustrates single electrode capacitance vs. voltage characteristics for 0.5 cm² MWCNT electrodes soaked in SLS for 12 hr. FIG. 6C illustrates capacitance vs. voltage (3 mV/s) for MWCNT electrodes soaked in SLS for a-5 min, b-30 min, c-2 h, d-24 h. FIG. 6D illustrates gravimetric capacitance vs voltage for MWCNT electrodes soaked in SLS for 24 hr at various scan rates.

FIG. 7A illustrates peak anodic and cathodic current vs. $v^{0.5}$ (scan rate)$^{0.5}$ for MWCNT electrodes soaked in SLS for 5 min and 12 h. FIG. 7B illustrates a Nyquist plot of electrodes from FIG. 7A over a frequency range of 10 kHz to 0.1 Hz. Galvanostatic discharge curves are shown in FIG. 7C for MWCNT electrodes soaked in SLS for 5 min and 24 h and in FIG. 7D for MWCNT electrodes soaked in SLS for 24 h at various discharge currents.

FIG. 9A illustrates gravimetric capacitance of paper electrodes containing a) HCNT, b) HCNT-25L, c) HCNT-100L-24h, d) HCNT-100L, e) HCNT-25L-24h, f) HCNT-100L-24h. FIG. 9B illustrates the linear relationship between peak current and square root of scan rate of the electrochemical properties of HCNT and lignin-modified HCNT electrodes. Galvanostatic cycling measurements are shown in FIG. 9C for pure HCNTs and in FIG. 9D for SLS-modified HCNT paper electrodes. FIG. 9E illustrates Nyquist plots of the electrochemical properties of HCNT and lignin-modified HCNT electrodes.

DETAILED DESCRIPTION

Figure 1:
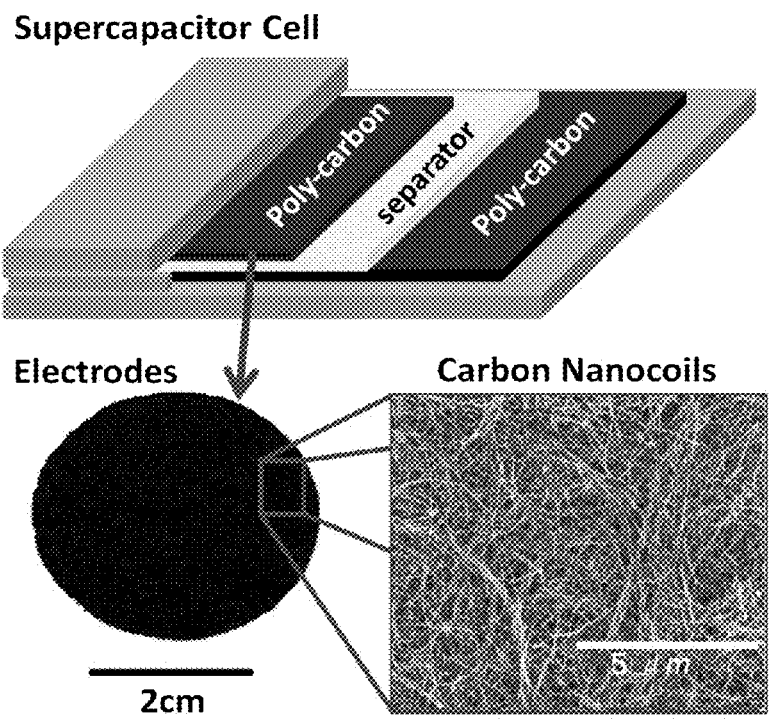
FIG. 1 is an illustrative schematic of a supercapacitor device utilizing free-standing polymer-carbon composite electrodes. The composite electrodes comprising helically-coil carbon nanotubes (HCNT) modified with sodium lignosulfate (SLS) are shown along with a scanning electron micrograph showing the nanostructure within the carbon paper electrodes.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, organometallic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

In accordance with the purpose(s) of the present disclosure, as embodied and broadly described herein, embodiments of the present disclosure, in one aspect, relate to composites including a carbon nanomaterial having a redox-active material, such as a polymer containing redox groups, disposed on the carbon nanomaterial, methods of making the composite, methods of storing energy, and the like.

Embodiments of the present disclosure provide for the synthesis of high-surface area, polymer-modified carbon nanomaterial (e.g., mesoporous carbon, carbon nanotubes, carbon nanofibers, graphene and/or helically coiled carbon nanostructures) composite that can be used as an electrode for high-power, high-energy density electrical energy storage (e.g., supercapacitors and batteries). In an embodiment, the three-dimensional carbon nanomaterial can provide the high conductivity for efficient electrical transport while the redox material (e.g., a naturally occurring biorenewable polymer and/or lab synthesized polymers) coating can provide redox active groups for enhanced charge capacity through Faradaic charge transfer. Embodiments of the present disclosure allow for the use of non-conductive materials on highly porous, high surface area, three-dimensional carbon networks for an electrode in electrical energy storage devices (e.g., batteries, supercapacitors, electrochemical capacitors, fuel cells, etc.).

In an embodiment, the composite (also can be referred to as "composite structure") includes a carbon nanomaterial having a redox material or redox polymer coated on a portion or all of the carbon nanomaterial. In an embodiment, the redox material or polymer can be coated on about 1 to 100% or about 1 to 50% of the surface area of the carbon nanomaterial. In an embodiment, the ratio of carbon nanomaterial to redox material or polymer can be about 1:100 to 1:1 or about 100:1 to 1:1. In an embodiment, the redox material or polymer can have a thickness of about 1 nm to hundreds of nm (e.g., about 100 nm, about 200 nm or about 500 nm) on the carbon nanomaterial.

In an embodiment, the carbon nanomaterial can include a carbon material that has a high surface area and can provide a three dimensional porous framework for the redox material or polymer to form a coating thereon. A carbon nanomaterial can include a material that has at least 50% carbon and contains a length scale or feature with a dimension in the nanometer range (e.g., about 0.1 nm to 500 nm). In an embodiment, the carbon nanomaterial can include forms of coal, graphite, activated carbon, graphene, graphene oxide, carbon nanotubes, carbon nanowires, helically coiled carbon nanostructures, and combinations thereof. In an embodiment, the carbon nanomaterial can include a plurality of carbon nanostructures and/or types of carbon nanostructures. In an embodiment, the carbon nanostructures can include a single walled carbon nanotube, a multi-walled carbon nanotube, a carbon nanowire, a helically coiled carbon nanotube/nanowire, carbon nanoparticles, graphene, graphene oxide and a combination thereof. In an embodiment, the carbon nanomaterial surface may be modified with functional groups containing oxygen, nitrogen, phosphorus, sulfur, or other surface characteristics and coated by organic and inorganic surfactants such as sodium dodecyl sulfate, Triton X-100, and the like. In general, the prefix "nano" refers to one or more of the dimensions (e.g., diameter) that is less than about 500 nm, but one or more of the dimensions (e.g., length) can be greater than about 500 nm, for example a carbon nanowire can have a length of greater than 500 nm.

In an embodiment, the composite has a three dimensional shape, such as a carbon material paper (or bucky paper). In an embodiment, the three dimensional carbon nanomaterials posses high surface area or are simply said to be porous i.e., exhibit a free volume within the carbon structure, or empty space, that exhibit a range of physical dimensions, including micro pores (pore-size <2 nm), meso pores (pore-size about 2-50 nm), and/or macro pores (pore-size >50 nm). The free volume within the three dimensional material may be about 1% to 80% or about 5% to 50%. In an embodiment, the carbon nanomaterial can have a thickness of about 0.4 nm to several (e.g., about 3 to 5 mm) mm and a length and/or width (or diameter) on the order of microns (e.g., about 1 micron) to meters (e.g., about 5 meters). An embodiment of the present disclosure provides for a 1 mm or greater thick, mechanically robust, flexible and electrically conducting composite (e.g., electrode) paper, which can have variable nanostructure (e.g., nanotube) density. In an embodiment, the total content of the carbon nanomaterial in the composite may vary from about 1 vol % 100 vol % or about 5 vol % to 50 vol %.

As mentioned above, the carbon nanomaterial can include single walled carbon nanotubes (SWCNTs) or multi-walled carbon nanotubes (MWCNTs). SWCNTs can be visualized as single layer graphene sheets rolled up into a seamless cylinder. Embodiments of the MWCNT can include 2 or more walls, 5 or more walls, 10 or more walls, 20 or more walls, or 40 or more walls. In an embodiment, the carbon nanotubes including SWCNTs and MWCNTs may have diameters from about 0.6 nanometers (nm) up to about 100 nm. In an embodiment, the SWCNTs and MWCNTs may have a length from about 50 nm up to about 1 millimeter (mm), or greater.

In an embodiment, the carbon nanomaterial can include helically coiled carbon nanotubes (from here on referred to as HCNTs) or nanowires which are not hollow (from here on referred to as HCNWs). In an embodiment, the helically coiled carbon nanowires or tubes may have diameters from about 0.6 nanometers (nm) to about 100 nm. In an embodiment, the helically coiled carbon nanowires or tubes can have a length from about 50 nm to about 1 millimeter (mm), or greater.

In an embodiment, the carbon nanomaterial can include carbon nanoparticles. In an embodiment, the carbon nanoparticles can have a spherical, semispherical, polygonal, or a random shape. In an embodiment, the carbon nanoparticles may have a longest dimension (e.g., diameter) of about 0.6 nanometers (nm) to about 500 nm.

In an embodiment, the carbon nanomaterial can include graphene. graphene oxide, or reduced graphene oxide. In an embodiment, graphene. graphene oxide, or reduced graphene oxide, can have a number of layers of 1 to 2, 3 to 5, 5 or higher.

In an embodiment, the carbon nanomaterial can include mesoporous or macroporous carbon materials. Mesoporous carbons have pore sizes of about 2 and 50 nm and macroporous carbon materials have pore diameters of about 50 nm or more. In an embodiment, the carbon nanomaterial can be mesoporous and macroporous (e.g., includes pores of varying sizes).

In an embodiment, the redox polymer can be a non-conductive polymer containing reversible redox groups. The redox group may exist within the main chain of the polymer or as a pendant group connected to the polymer. The polymer may be linear or branched, or combinations of linear and branched. In an embodiment, the redox polymer can include lignin, sulfonated lignin, or salts thereof; polyvinylquinone, polyvinyl ferrocene, and polymers containing redox active metal centers, such as ruthenium or ruthenium oxide, manganese or manganese oxide. In an embodiment, the redox polymer is lignin, sulfonated lignin, or salts thereof.

Lignin, a renewable biopolymer from plants and trees, is not electrically conductive, therefore pure lignin electrodes show negligible electrochemical activity, which is limited to the redox groups at the electrode interface. As indicated, these materials can be incorporated within composite polymers to achieve high energy capacity electrodes.

In an embodiment, the composite can be made using a fabrication process having a polymer and nanotube dispersion followed by filtration to produce the composite. In an embodiment, this method can be a convenient platform for large scale composite production. The composite can be made with adsorbing the polymer onto the nanomaterial and then depositing the composite on a substrate using solution processing methods, such as ink-jet printing, gravure printing, and the like and allowing the ink to dry. In an embodiment, the composite can be made by directly growing carbon nanomaterial onto a metal/alloy. In an embodiment, the metal foil could be Al, Fe, Ni, or Stainless Steel. In an embodiment, the composite can be made by spin coating or dip coating the carbon nanomaterial into a polymer solution. In an embodiment, carbon nanomaterials may be aligned or arranged in a periodic fashion to allow the penetration of polymer to form the composite. In an embodiment, the composite can be made by cold or hot mechanical pressing, and plasma sintering.

In an embodiment, the carbon nanomaterial can be chemically grown, coated, spread, or spray coated directly on a current collector with the redox polymer, where the current collector can be made of a material such as copper, aluminum, nickel, iron, and a combination thereof. In an embodiment, this can be done in the presence or absence of a binding material such as a spray adhesive or polymeric binder (e.g., polyvinylalcohol and the like).

In an embodiment, the composite can be used as an electrode for storing electrical charge. In particular, the composite can be used as an electrode in an energy storage device such as a capacitor, a battery, a supercapacitor, an electrochemical capacitor, a fuel cell, and catalytic energy storage device or a thermoelectric device. In an embodiment, the composite can be in the form of a "paper" electrode. In an embodiment, the composite can be in the form of a film deposited on another substrate. For example, the device can include one or more (e.g., 2, 4, 6) composite papers having an ion-permeable separator (e.g., porous polymer film, or a non-woven fiber film) disposed between them. On the side opposite the separator for each composite paper, an electrode (e.g. MWCNT buckypaper) is positioned. It is envisioned other configurations are possible and contemplated to be within the scope of the present disclosure.

EXAMPLES

Now having described the embodiments of the present disclosure, in general, the examples describe some additional embodiments of the present disclosure. While embodiments of the present disclosure are described in connection with the examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

In this Example, we demonstrate the synthesis of high-surface area, polymer-modified carbon nanotube (or helically coiled carbon nanotube) paper electrodes for high-power, high-energy density supercapacitors using simple fabrication methods. The use of conductive, high surface area carbon nanomaterials allows for the integration of non-conductive polymers containing reversible redox groups with higher charge capacity, such as lignin or sulfonated lignin. In these composite systems, the carbon nanomaterial provides the high conductivity for efficient electron transport and the highly three-dimensional network structure, and the thin polymer coating provides redox active groups for increases charge capacity through Faradaic charge transfer. The simple electrode fabrication process comprised of polymer and nanotube dispersion followed by filtration produces a convenient platform for large scale device production and material characterization.

Embodiments of the present disclosure allow for the use of non-conductive materials on highly porous, three-dimensional networks for battery and supercapacitor electrodes. Materials that were previously dismissed for use in carbon-based energy storage systems may now find a role by applying our robust platform and synthesis process. Compared to paper electrodes comprised of pure carbon nanocoils, paper electrodes prepared with redox polymer modified nanocoils show an increase in electrode capacitance from 50-100 F/g to over 600 F/g. Composite electrodes were shown to adsorb up to 30 wt % polymer through the dispersion-adsorption-filtration fabrication process and decrease nanotube and nanocoil aggregation in the resulting paper electrodes. The incorporation of lignin, the $2^{nd}$ most abundant polymer, into carbon nanomaterial networks provides a battery or supercapacitor electrode that is both environmental friendly and extremely low-cost. Flexible and robust supercapacitors with high power and energy densities were also prepared using the polymer modified carbon paper electrodes. Composite electrode papers may provide a transformative approach to electrode synthesis form low-cost and flexible carbon based energy storage systems.

Results and Discussion

Figure 3:
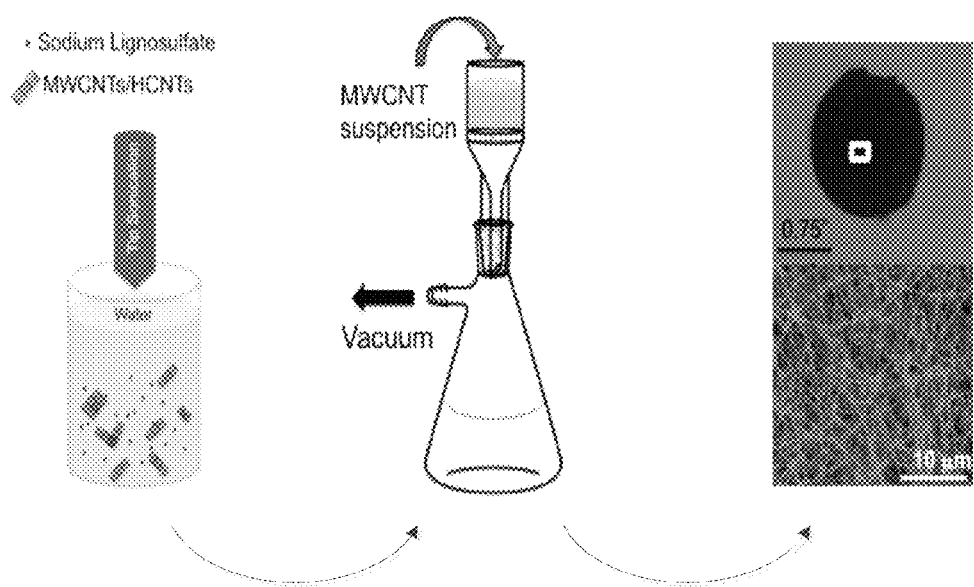
FIG. 3 illustrates a schematic of fabrication process for sodium lignosulfonate-modified carbon nanomaterial paper electrodes. Carbon-nanomaterials are dispersed in aqueous solutions with sodium dodecyl sulfate (SDS) or SLS, sonicated at high power, filtered, rinsed with DI water, and dried in vacuum to produce free-standing composite electrodes. The electrodes may also be soaked in solutions containing polymers, e.g., 40 g/L SLS to increase the polymer composition, then rinsed with DI water, and dried in vacuum.

Robust, high surface area carbon nanotube paper electrodes can be prepared using simple dispersion and filtration methods, which have been previously reported as electronic materials. Briefly, high aspect ratio carbon nanomaterials, such as multiwall carbon nanotubes (MWCNTs) or helically-coiled carbon nanotubes (HCNTs), are dispersed in aqueous solutions using a surfactant, sodium dodecyl sulfate (SDS). After ultrasonicating the solution for 15 min to disperse the aggregated nanomaterials, the aqueous dispersion are vacuum-filtered through a polyamide membrane, copiously rinsed with deionized water and dried at 60° C. for 8 hr. Free-standing carbon paper electrodes are obtained by peeling the MWCNT or HCNT papers from the polyamide membrane. A schematic of the fabrication process is shown in FIG. 3. It's noteworthy to mention that the freestanding paper electrodes are very robust and durable; they can be burned under a flame, soaked in acids, bases, and organic solvents and still handled with ease. As will be shown later, electrodes can be tested in a simulated coin cell apparatus and then incorporated into flexible devices without any noticeable loss in performance.

Figures 4A, 4B:
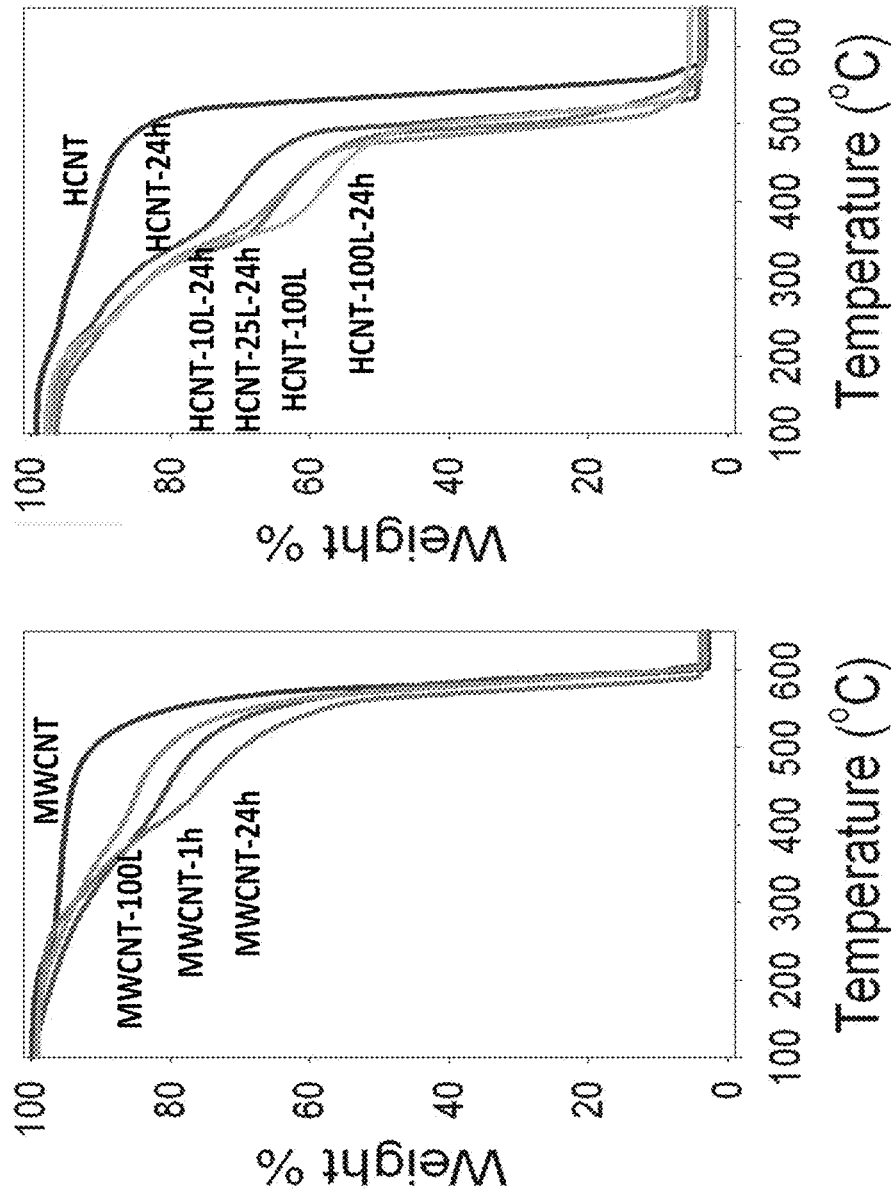
FIG. 4A is a graph that illustrates the thermal gravimetric analysis (TGA) of multi-wall carbon nanotube (MWCNT) electrodes with varying amounts of lignin and FIG. 4B is a graph that illustrates TGA of HCNT electrodes with varying amounts of lignin. In each figure, samples are labeled as CCCNT-SLSL-tth, where CC indicates the carbon type, e.g. MWCNT or HCNT, SLS is the weight percent of SLS as the surfactant, e.g., no value is 0% (pure SDS) and 100 L is 100% SLS, respectively, and tt is the amount of time the substrate is soaked in SLS after synthesis (no value is equivalent to no soaking).

The polymer content and structure in the composite electrode paper was determined using thermal gravimetric analysis, due to the highly contrasting thermal stability between the polymer and the carbon nanomaterial, and using electron microscopy to evaluate the surface morphology and structure. Pure MWCNT and HCNT paper electrodes are prepared by dispersing the carbon nanomaterial (0.3 mg/mL) in 10 mg/mL sodium dodecyl sulfonate (SDS). After filtering the carbon nanomaterial dispersions to achieve the paper electrode, the surfactant is washed away by rinsing copiously with DI water and methanol. The thermal gravimetric profiles for the pure, vacuum-dried MWCNT and HCNT papers are shown in FIGS. 4A and 4B, respectively. Each scan displays a slight decrease in mass around 150° C. from the loss of residual SDS. Under nitrogen, the MWNT paper decomposes at 600° C. and the HCNT paper decomposes around 570° C. The less density packing in the coiled, single-walled nanocoils leads to a slightly lower decomposition temperature compared to the papers containing more closely-packed multi-wall carbon nanotubes.

Figure 2A:
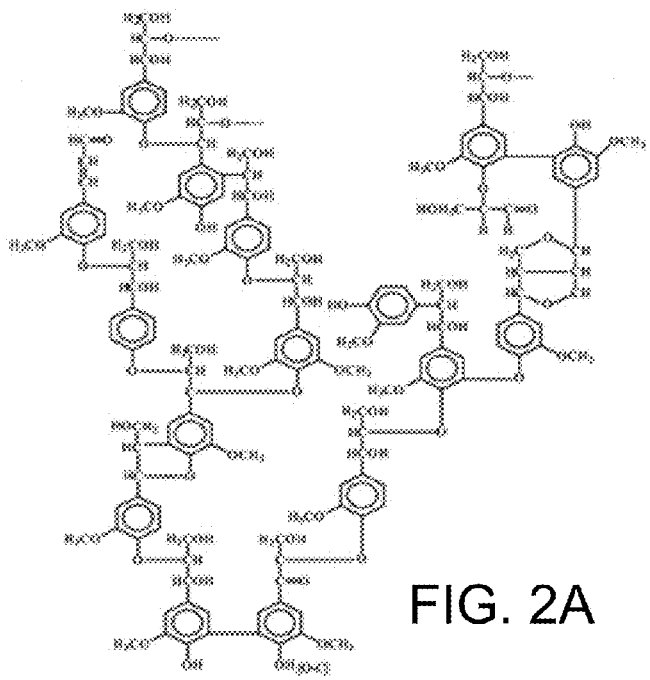
FIG. 2A illustrates a generic chemical structure of lignin.
Figure 2B:
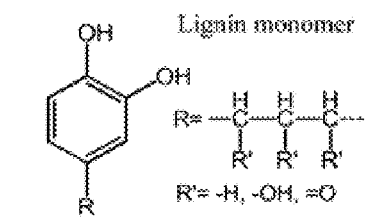
FIG. 2B illustrates a typical lignin monomer composition.
Figure 2C:
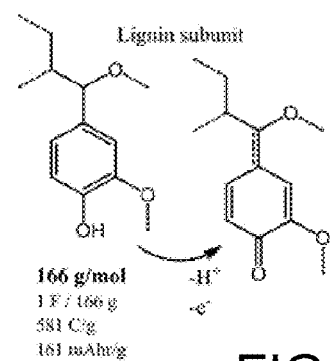
FIG. 2C illustrates a representation of the oxidation-reduction processes that can occur within the phenolic groups. Oxygen rich forms of lignin can have charge capacities as high as 160-170 mAhr/g.

Carbon papers comprising MWCNTs and HCNTs can also be prepared using redox polymers as the surfactant for dispersing the nanomaterials. Sodium lignosulfonate, which is shown in FIGS. 2A-C, contains aromatic rings to promote binding to the carbon nanotubes and HCNTs, sulfonated groups from improved solubility in aqueous solutions and reversible redox groups to provide a Faradaic capacitance boost to the resulting carbon paper electrode. Dispersions were prepared with 0.3 mg/mL MWCNTs (or HCNTs) in 3 mg/mL SLS in DI water and filtered to achieve polymer modified paper electrodes. After paper electrode fabrication, the polymer remains closely bound to the carbon nanomaterial, even after copious rinse with DI water and methanol. Thermo gravimetric profiles shown that that paper electrodes prepared using SLS as the surfactant retain 13 wt % polymer in the MWCNT electrodes (MWCNT-100L) and 25 wt % polymer in the HCNT electrodes (HCNT-100L). The curvature and higher surface area of the single-wall nanocoils leads to a significant increase in polymer mass adsorbed relative to the multiwalled nanotubes.

The amount of polymer bound to the carbon paper electrodes can be increased by soaking the carbon paper electrodes in 40 mg/mL sodium lignosulfonate (SLS) solution after the paper electrode fabrication. FIG. 4A shows that the mass of polymer adsorbed to the MWCNT paper electrodes can be increased by soaking the polymer-modified paper electrodes in SLS for 1 hr (MWCNT-1h) and 24 hr (MWCNT-24h). A maximum of 18-19 wt % SLS can be adsorbed on the MWCNT papers. We expect that the mass could be further increased on single wall nanotubes due to the high surface area to weight ratio. As anticipated, the mass of SLS adsorbed on HCNT paper electrodes could be increased up to 38-39 wt %. Later, we will show that the optimal electrochemical properties are obtained on HCNT electrodes containing 30 wt % polymer. In order to be utilized for Faradaic energy storage, the redox polymer must be in contact, or close vicinity to the nanomaterial electrode. In FIG. 4B, the composition of the polymer within the composite paper electrode is shown for paper electrodes containing pure HCNT (HCNT), these electrodes soaked in SLS for 24 hr (HCNT-24h), HCNT papers prepared using SLS as the surfactant (HCNT-100L), and these electrodes soaked in SLS for 24 hr (HCNT-100L-24h). Also shown are two other HCNT paper electrodes that were soaked in SLS for 24 hr: one prepared using a surfactant ratio of 90/10 SDS/SLS (HCNT-10L-24h) and the other with a surfactant ratio of 75/25 SDS/SLS (HCNT-25L-24h).

TABLE sample descriptions for MWCNT and HCNT composite paper electrodes with and without adsorbed sodium lignosulfate (SLS).

| Electrode | Carbon Source | Surfactant SDS/SLS | | Soak Duration (hr) |
|---|---|---|---|---|
| HCNT | HCNT | 100% | 0% | None |
| HCNT-24h | HCNT | 100% | 0% | 24 |
| HCNT-100L | HCNT | 0% | 100% | None |
| HCNT-100L-24h | HCNT | 0% | 100% | 24 |
| HCNT-10L-24h | HCNT | 90% | 10% | 24 |
| HCNT-25L-24h | HCNT | 75% | 25% | 24 |
| MWCNT | MWCNT | 100% | 0% | None |
| MWCNT-100L | MWCNT | 0% | 100% | None |
| MWCNT-1h | MWCNT | 100% | 0% | 1 |
| MWCNT-24h | MWCNT | 100% | 0% | 24 |

Figure 5A:
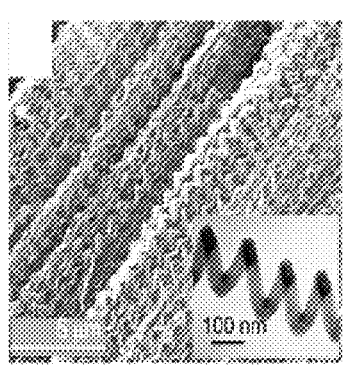
FIG. 5A illustrates scanning electron micrographs (SEMs) of composite electrodes fabricated using helically-coiled carbon nanotubes (HCNT) and sodium dodecylsulfate (SDS) as the surfactant.

The microstructure of carbon paper electrodes prepared with the various surfactants with and without post treatment in sodium lignosulfonate were examined using scanning electron microscopy (SEM). HCNT paper electrodes prepared using the standard SDS surfactant is shown in FIG. 5A. These electrodes are best characterized by a three-dimensional network of nanocoil aggregates. Although the surface area of the three-dimension network of nanocoils is expected to be high, the close packing of nanocoils in aggregates will limit the electrochemical activity. When paper electrodes are fabricated using SLS polymer surfactant (HCNT-100L), shown in FIG. 5B, the nanocoils experience a significant decrease in aggregation and maintain spacing between individual tubes. These electrodes exhibit ideal properties for electrodes as the polymer prevents nanocoil aggregation to increase ion conductivity in addition to providing a Faradaic charge storage mechanism. SEM images show a more homogenous structure relative to the HCNTs electrodes prepared using SDS as the surfactant. The low conductivity of the redox polymer causes blurriness in the image; however, the individual nanocoils can still be identified. Polymer composites can also be prepared by soaking the HCNT paper electrodes in SLS for 24 hrs after fabrication (HCNT-24h). SEM images display a comparable homogenous structure compared to the as-prepared substrates (HCNT), with an increased polymer content.

Figure 5B:
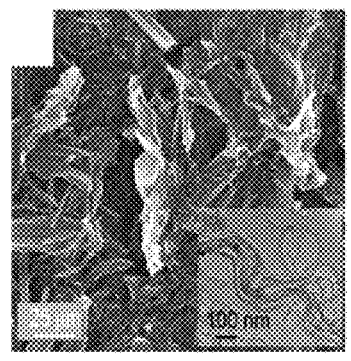
FIG. 5B illustrates SEMs of composite electrodes fabricated using HCNTs with sodium lignosulfonate (SLS) as the surfactant.
Figure 5C:
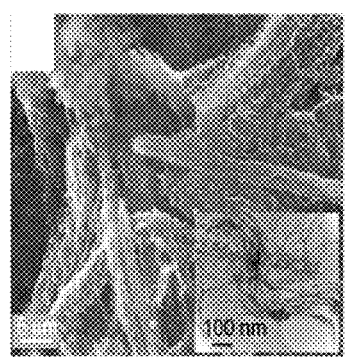
FIG. 5C illustrates SEMs of composite electrodes fabricated using HCNTs with SDS surfactant followed by soaking in SLS for 24 h. Transmission electron micrographs (TEMs) are shown in the insets.

Transmission electron micrographs are shown for each material as insets in FIGS. 5A-C. The bare HCNT electrodes show sharp edges along the nanocoils. When polymer is incorporated, the nanotube edges are blurred due to the presence of the non-conductive polymer. Polymer aggregates are also visible along the surface of the coiled-nanotubes.

As indicated by thermal gravimetric analysis, carbon paper electrodes can be prepared with varying amounts of redox polymer loading. This polymer not only increases the charge capacity of the polymer electrodes, as will be shown through the electrochemical analysis, but the polymer prevents aggregation of individual nanocoils or nanotubes and helps achieve homogeneous electrode morphology. The polymer modified carbon nanomaterial electrodes exemplify ideal structures for electrical energy storage electrodes. The high surface area of the nanocoils provides a mechanism for energy storage through the electrical double layer capacitance (EDLC) and also promotes efficient binding of redox polymers. Carbon nanomaterial electrodes without additional redox character exhibit purely EDLC energy storage which limits their charge capacity and energy density. While electrically conductive polymers have displayed suitable properties for supercapacitors, their poor stability, lower theoretical capacity and low potential range for operation limit their use in large format or light weight energy storage systems. Non-conductive polymers with pendant redox groups, on the other hand, may find use in battery and supercapacitor systems since their can exhibit theoretical charge capacities as high as 500 mAhr/g and their redox potential can be tailored to fall within an operating voltage range of interest. However, these materials have not found use in energy storage due to their insulating behavior, and cost-effective, lightweight, and conductive scaffolds have not been reported. Polymer modified HCNTs or MWCNTs demonstrates a clear example of how two disparate materials can be combined to exploit material properties. HCNTs provide the high surface area and electrical conductivity for high power density while the polymer provides the redox groups for Faradaic charge transfer for increased energy density. Furthermore, the three-dimensional nature of the porous network allows for the polymer to expand and contract upon oxidation in addition to providing electrolyte saturation for fast ion transport.

Electrochemical analysis was performed on the freestanding lignin-modified paper electrodes without incorporating any additional components, such as binder conductive material. In fact, each component of our system displays characteristics of these typical additives: the high surface area carbon is also highly conductive and the redox polymer acts like a glue to hold the nanocoils in place. Single electrode half-cell measurements are conducted by placing the freestanding carbon papers in a Teflon cell with 0.5 cm$^2$ area exposed to an acid electrolyte. Prior to electrochemical analysis, the paper electrodes are conditioned by cycling the electrode potential between −0.2 and 1.2 at a scan rate of 50 mV/s. With each cycle, the redox peak associated with the lignosulfonate increases as the redox active group migrates toward the nanotube. After 5-10 cycles, a stable voltammagram is achieved and the electrochemical performance is investigated. Each electrode is characterized using cyclic voltammetry, electrical impedance spectroscopy and galvanostatic cycling.

Figure 6A:
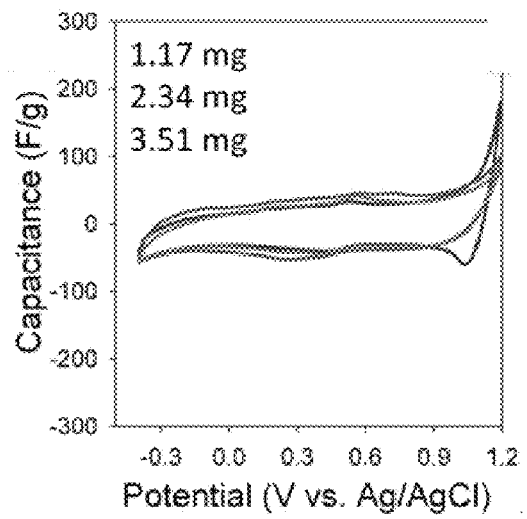
FIGS. 6A to 6D illustrate electrochemical properties of MWCNT and lignin-modified MWCNT electrodes.
Figure 6B:
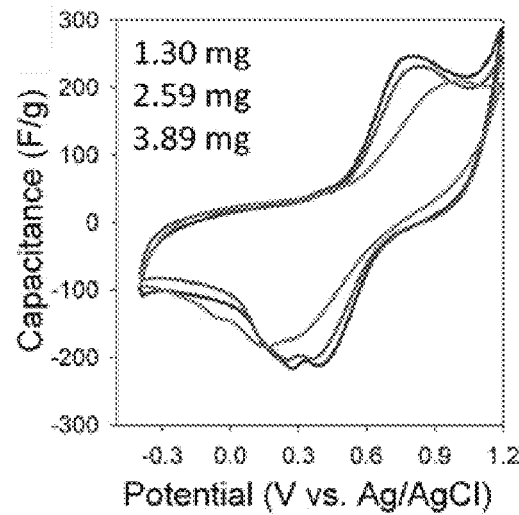

Cyclic voltammograms were recorded in 1M perchloric acid using potential scan rates between 3 and 1000 mV/s to evaluate the redox processes and ion-transport properties. The gravimetric capacitance is reported by normalizing the measured current by scan rate and mass, which was measured using a microbalance. Paper electrodes prepared using MWCNTs dispersed with SDS are shown in FIG. 6A. As expected, a rectangular voltammogram is observed due to the charge storage mechanism associated with EDL capacitance, which is independent of electrode mass for electrodes measured at 30 mV/s (reported as mass per 0.5 cm$^2$ substrate). An average capacitance of 50 F/g is obtained for the MWCNT papers, which is expected due to the surface area of ~60-100 m$^2$/g. When the MWCNT paper electrodes are coated with 15 wt % lignosulfonate, a significant increase in performance is obtained, as shown in FIG. 6B. A large redox peak is observed around 0.6 V vs Ag/AgCl which corresponds to the redox potential of the quinone/phenol groups within the sulfonated lignin. A peak gravimetric capacitance of 250 F/g is measured with an average capacitance of 150 F/g in the range of 0 to 1 V.

Figure 6C:
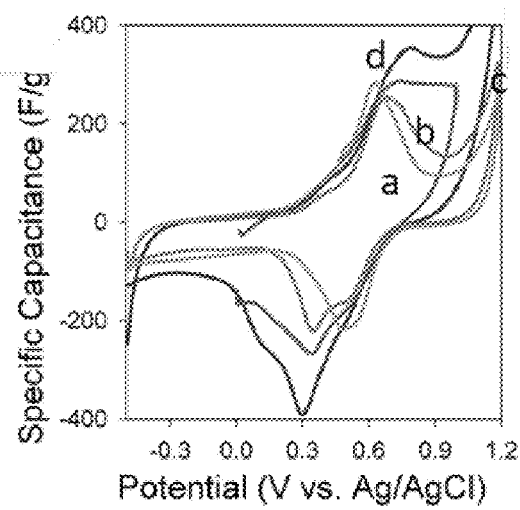
Figure 6D:
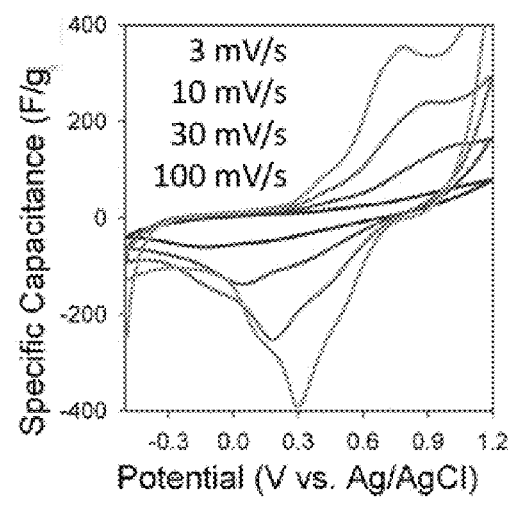
Figure 7A:
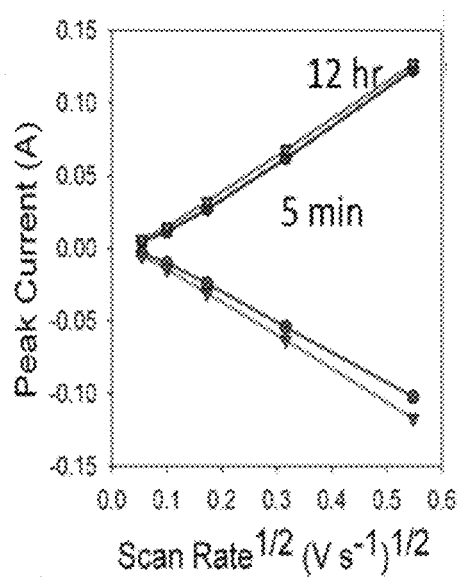
FIGS. 7A to 7D illustrate additional electrochemical properties of MWCNT and lignin-modified MWCNT electrodes.

The electrochemical performance of non-conductive redox materials are limited by diffusion of the ions or redox species to the electrode surface. MWCNT papers loaded with 18 wt % SLS exhibit significant scan rate dependence, as shown in FIG. 6D. At high scan rates (v>100 mV/s), nearly ohmic behavior is observed because and very little oxidation-reduction behavior occurs due to diffusion limitations associated with the redox group. At low scan rates, sharp peaks are resolved with peak capacitance values approaching 400 F/g. It is important to note that such high capacitance values have not been observed with redox polymers with masses on the order of milligrams. The use of highly conductive, three dimensional scaffolds achieved by the carbon nanomaterials within the paper electrode provides new possibilities for low cost energy storage materials, such as solution processable redox polymers. The linearity in peak current with the square root of scan rate (FIG. 7A) indicates a diffusion limited redox process. Even though fairly resolved peaks are observed for thin polymer films (soaked for 5 min), the fact that the peak current remains proportional to $v^{1/2}$ for polymer loadings below 5 wt % indicates that the diffusion limitation is associated with the redox group on the polymer migrating toward the electrode rather than ion diffusion through the polymer for charge compensation.

The electrochemical performance can be further increased by controlling the amount of polymer adsorbed to the MWCNT papers. FIG. 6C shows the gravimetric capacitance for polymer modified MWCNT electrodes soaked in 40 mg/mL SLS with increasing time, from 5 min up to 24 hr. Because the polymer is non-conductive, only a thin film within close vicinity of the nanotube surface can be electrochemically addressed. Films soaked with lignin for much longer than 24 hr, or soaked with sequential films display a decrease in gravimetric capacitance as addition polymer adsorbs to the surface, but simply adds a resistive coating rather than additional redox behavior. Furthermore, ion diffusion begins to play a role with increasing polymer content, as evidenced by the peak broadening shown with increasing soak time.

Figure 7B:
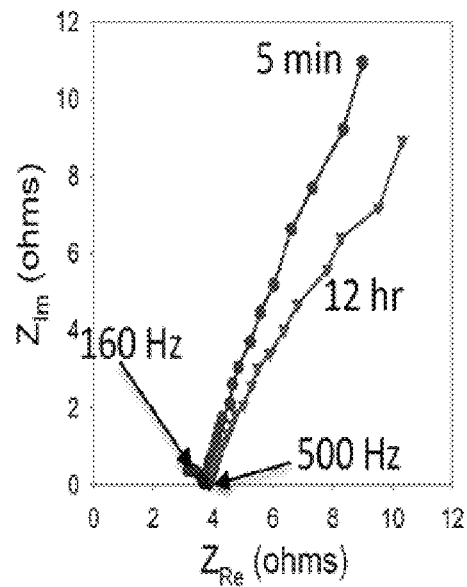

Electrical impedance spectroscopy confirms the ion diffusion as evidenced by the 45° Warburg diffusion character at frequencies above 160 Hz and 500 Hz for MWCNT electrodes with 5 wt % polymer and 18 wt % polymer, respectively (FIG. 7B). At lower frequencies, a semicircle is observed resulting from charge transfer resistance (which is in parallel with the electrical double layer capacitance). These profiles indicate that charge transfer is the limiting process on short time scales (high frequency) while the impedance to electron transport is limited by ion diffusion on long time scales (low frequency). Electrodes with thin polymer films contain less redox species and therefore transfer from charge transfer to diffusion limited impedance characteristics at lower frequencies.

Figure 7C:
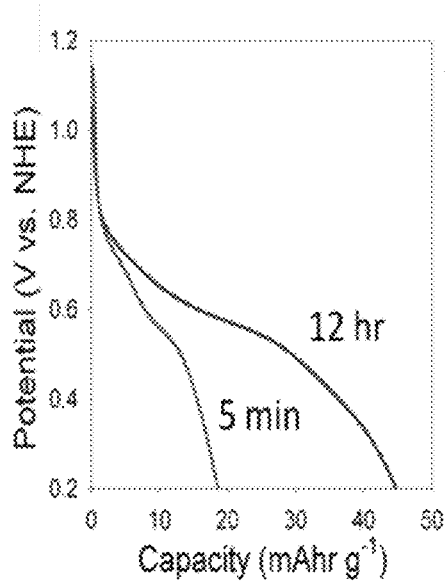
Figure 7D:
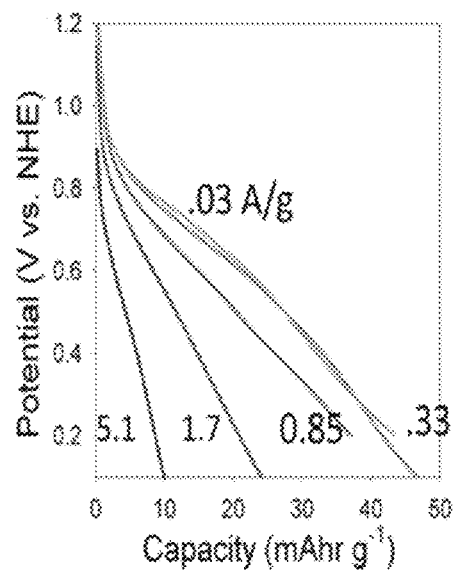

Electrode charge capacities as a function of discharge rate, in terms of Amps per gram, were measured using galvanostatic cycling with varying discharge current densities. Electrodes were cycled between potentials of 0 to 1.2 V vs. NHE with rates of 0.03 to 5.1 Ng. FIGS. 7C-7D show the discharge characteristics of MWCNT papers coated with 18 wt % polymer. A linear decrease in potential is observed from 1.2 to 0.8 V, followed by a potential plateau in the region of 0.6-0.8 V (associated with the redox potential of the lignosulfonate), followed by a linear decrease in potential from 0.6V to 0V. These features starkly contrast that of a purely carbon based electrochemical capacitor that exhibits a linear decrease in potential as ion desorb from the electrode surfaces. The presence of the voltage plateau confirms that a localized redox process occurs on the electrode surface. Polymer-modified MWCNT electrodes display charge capacities as high as 50 mAhr/g, which is notable for fully-assembled electrodes comprising purely organic materials.

MWCNT paper electrodes provide a high surface area and conductive scaffold for integrating non-conductive redox polymers, however, the nature of the multiwall tubes impose a few key limitations on electrode performance. First, the nature of the multiwall structure leads to higher carbon nanotube weight content in the composite electrode material than is necessary to achieve a suitable conductivity and surface area. The tubes within the multiwall structures may not contribute significantly to the EDLC properties due to the internal spacing. Additionally, the multiwall nanotubes investigated in this study typically exhibit lower aspect ratios and contain additional amorphous material, which may limit the surface area for polymer adsorption. For this reason, paper electrodes were also synthesized using high aspect ratio helically-coiled carbon nanotubes (HCNTs) (Rao, et al.). The helically-coiled carbon nanotubes (HCNTs) contain numerous defects providing a higher surface area for polymer adsorption compared to straight tubes. It was hypothesized that the curvature produced by the helically-coiled tubes could increase the amount of polymer bound to the nanomaterial. The SEM micrographs in FIGS. 5A-C suggest that the use of the SLS polymer surfactant is beneficial for paper electrode synthesis as the polymer helps stabilize and separate individual HCNTs, whereas paper electrode prepared using SDS contain a large content of HCNT aggregates.

Figure 8A:
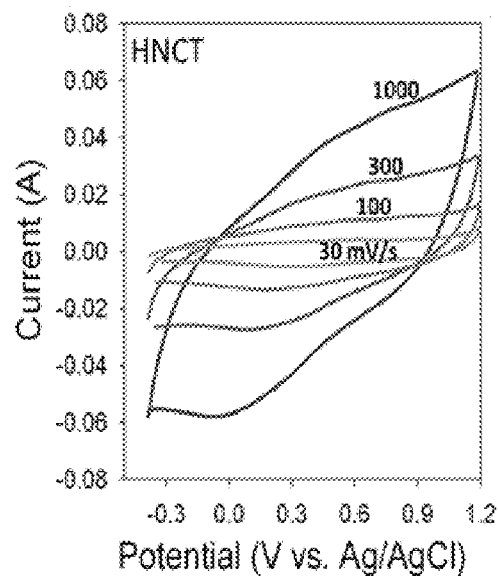
FIGS. 8A to 8D illustrate electrochemical properties of HCNT and lignin-modified HCNT electrodes. Current vs. voltage plots are shown in FIG. 8A for pure HCNT electrodes and in FIG. 8B for HCNT electrodes prepared with 25 wt % SLS (75% SDS) and then soaked in SLS for 24 h. Gravimetric capacitance vs scan rate is shown in FIG. 8C for pure HCNT electrodes and in FIG. 8D for HCNT electrodes modified with SLS. The mass of NCs used in each film is ~2 mg Carbon and the polymer modified HCNT electrodes contain 30 wt % SLS.
Figure 8B:
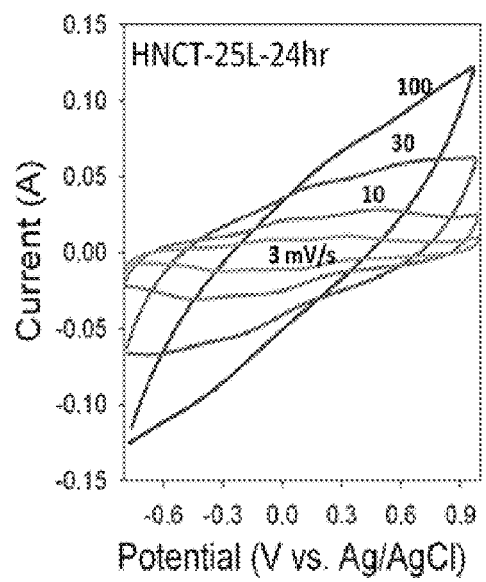
Figure 8C:
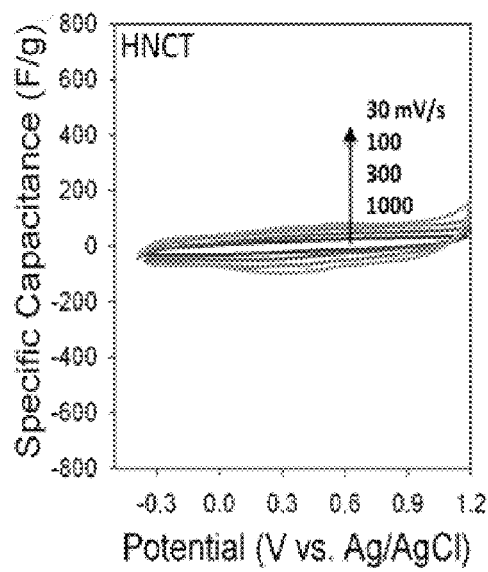
Figure 8D:
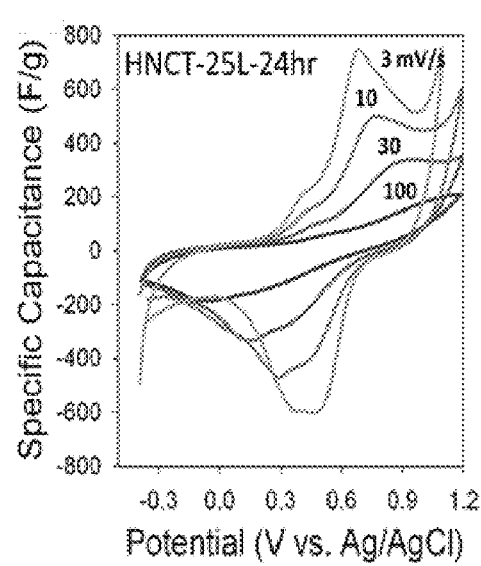

The electrochemical properties of the HCNT electrodes were investigated in a similar manner to the MWCNT electrodes described above. FIGS. 8A-D show the cyclic voltammetry profiles of HCNT papers prepared using SDS (panel a) as the surfactant, along with similar electrodes sequentially soaked in SLS solutions for 24 hr (panel b). Pure nanocoil electrodes could be cycled with scan rates up to 1000 mV/s without a significantly reduction in capacitance. The current normalized by scan rate and mass is shown in FIG. 8C with an average gravimetric capacitance of 80 F/g. The EDLC properties of the NC electrodes are nearly double that of MWCNT electrodes, presumably due to the higher surface area for ion adsorption. When the HCNT electrodes were soak in SLS, a significant increase in capacitance is observed (with ~20 wt % polymer). However, due to diffusion limitations within the redox polymer prevent the use of scan rates above 100 mV/s (compared to 1000 mV/s for pure HCNTss). Cyclic voltammograms normalized by scan rate and mass are shown in FIG. 8D, displaying a peak capacitance approaching 800 F/g at a scan rate of 3 mV/s arising from the redox behavior of the SLS.

As shown for MWCNT electrodes, the polymer content within the HCNT-polymer composite electrode can be varied by adjusting the deposition contains. Two approaches were taken to adjust the polymer content. First, HCNTs were dispersed in aqueous solutions using varying ratios of SDS, a conventional surfactant, and SLS, the redox polymer surfactant. Electrodes were formed by filtering solutions of HCNTs dispersed with pure SDS (HCNT), 10% SLS (HCNT-10L), 25% SLS (HCNT-25L), and pure SLS (HCNT-100L). Electrodes tested using the as-prepared paper electrodes showed a significant increase in capacitance with increasing SLS in the dispersion mixture. Next, these films were soaked in SLS solutions for 24 hr, then rinsed with DI and dried in vacuum. As shown by TGA, HCNT electrodes prepared with the pure SDS surfactant adsorbed the least amount of SLS (20 wt %) upon soaking, due to the HCNT aggregates in the paper electrode. HCNT electrodes prepared from solutions dispersed with even a small amount of SLS showed a significant increase in polymer adsorption (30 wt %) after soaking in lignin for 24 hr, which can be attributed to the improved dispersion and separation of HCNTs in the as-prepared electrodes. Paper electrodes prepared from pure SLS contained 30 wt % polymer in the as-prepared film, which was further increased to 38-39 wt % after further soaking in SLS solutions.

FIGS. 9 A-E show the electrochemical performance of HCNT paper electrodes with varying lignosulfonate (SLS) composition. Panel a shows that the gravimetric capacitance depends on the SLS content, as evidenced by the varying peak height. The composite electrode with the best electrochemical performance displayed a peak capacitance as high at 800 F/g with an average capacitance near 400 F/g in the range of 0 to 1V. These capacitance values are significant because these are measured on electrodes with a significant mass, average 2.3-2.5 mg HCNT with up to 1.0 mg polymer (per 0.5 cm$^2$), compared to sub microgram quantities typically reported. The composite electrode capacitance depends on the polymer weight % and the NC surfactant used to disperse the HCNTs prior to filtration. When the lignin wt fraction in the NC dispersion is increased from 0% (a) to 25% (b) to 100% (d) the electrochemical properties of as-prepared paper electrodes increases significantly, and is proportional to the polymer loading. A further increase in lignin content provides a slight increase in redox capacitance; however, too much SLS can actually inhibit the redox properties due to the resistive nature of the polymer. HCNTs paper electrodes, NC, NC25L and NCL soaked in SLS are shown in FIG. 8A as curve c, e, and f, respectively. The addition of polymer to the NCL electrode, which is expected to containing HCNTss with a uniform coating of SLS from the dispersion process, results in a decrease in gravimetric capacitance, which is directly related to the additional adsorbed polymer. Since the added polymer does not electrically contact the HCNTs network, the redox groups are not electrochemically addressed during the voltammetric scans. It should be noted that electrodes prepared from NCs dispersed in 25% SLS/75% SDS (b) showed a greater than 4× increase in capacitance after soaking in SLS solutions post electrode fabrication. These films gave the highest electrochemical performance of all the composites tested, and was verified through multiple independent tests. The increase in performance is attributed to the combination of surfactant materials, where the SDS initially helps disperse the NCs in solution, followed by SLS adsorbing to the coil. The SLS does not completely cover the HCNTs; therefore, additional polymer can be adsorbed after the paper electrode is formed. Similar properties are observed for electrodes prepared from dispersions containing 10% SLS and 25% SLS, which indicates that a small amount of polymer in the dispersion solution helps prevent the NCs from aggregating during the filtration process.

Figure 9A:
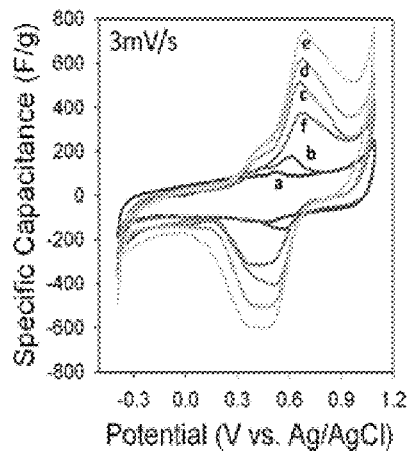
FIGS. 9A to 9E illustrate additional electrochemical properties of HCNT and lignin-modified HCNT electrodes.
Figure 9B:
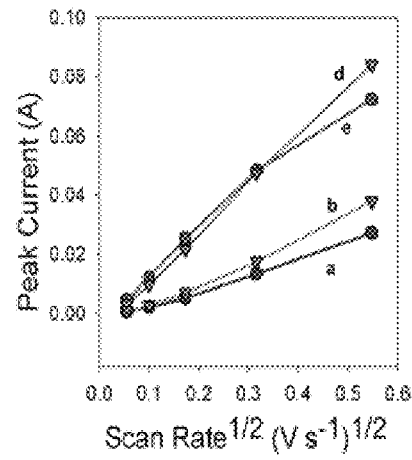

As shown for the MWNT paper electrodes, HCNT-polymer composite papers also exhibit diffusion-controlled redox properties, as evidenced by the linear relationship between peak current and square root of scan rate (FIG. 9B). Because the redox group in the polymer must migrate to and from the electrode upon oxidation and reduction, it is expected that all composites containing carbon nanomaterials and non-conductive redox polymers exhibit similar characteristics. Nyquist plots shown in FIG. 9E confirm the diffusion controlled behavior at lower frequencies (long time scales) as evidenced by the 45° Warburg diffusion character. Furthermore, the impedance measurements show an increase in charge transfer resistance at high frequency when lignin is added to the electrode, and a significant increase in resistance when excess polymer coats to HCNTs (f). This is consistent with the decrease in gravimetric capacitance reported when HCNT-100L electrodes were coated with additional SLS.

Figure 9C:
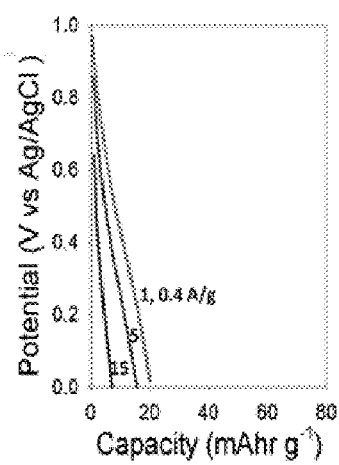
Figure 9D:
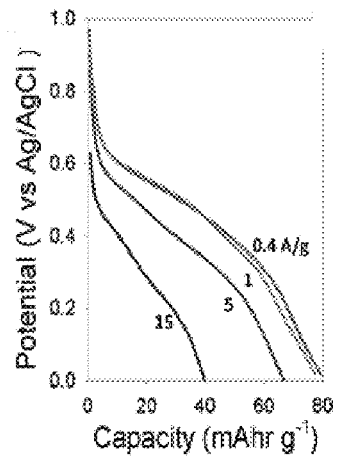
Figure 9E:
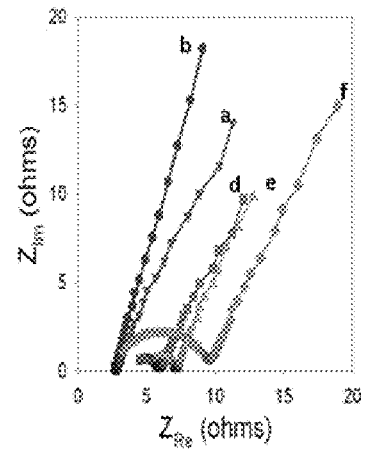

Galvanostatic cycling measurements are shown for pure HCNTs and SLS-modified HCNT paper electrodes in FIGS. 9C and 9D, respectively. Pure HCNT electrodes show a charge capacity of 20 mAhr/g, which can be expected from the nanomaterial surface area. The highest charge capacity was obtained using HCNT-25L-24h electrodes, which showed values of 80 mAhr/g for discharge rates below than 1 Ng. Increasing discharge rates result in an expected decrease in capacity, as shown in FIG. 9D. These values are significant because they represent fully assembled carbon electrode capacities; that is, no additional material is needed for a binder or current collector. The masses of NC electrodes investigated are on the order of mg quantities; however, we expect that the mass could be increased by simply fabricating thicker electrodes without significantly influencing the electrode performance, as shown for the MWNT electrodes.

Figure 10A:
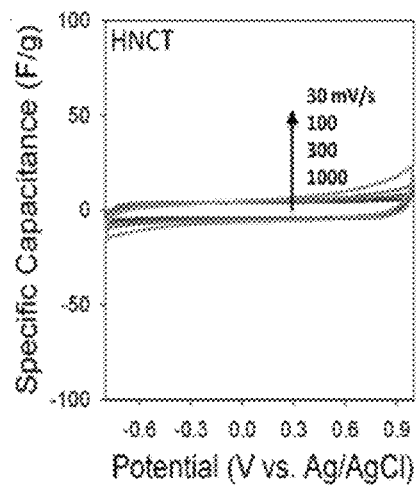
FIGS. 10A to 10D illustrate the electrochemical performance of flexible supercapacitor electrodes. Specific capacitance vs voltage plots are shown in FIG. 10A for pure HCNT electrodes and in FIG. 10B for lignin modified HCNT electrodes (HCNT-25L-24h) for various scan rates. Galvanostatic discharge curves are shown in FIG. 10C for pure HCNT electrodes and in FIG. 10D for lignin modified HCNT electrodes (HCNT-25L-24h) for various discharge current densities.
Figure 10B:
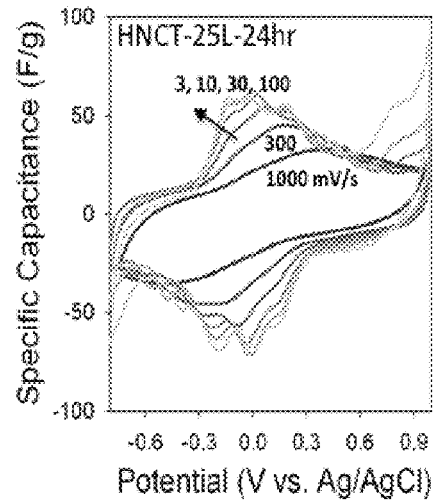
Figure 10C:
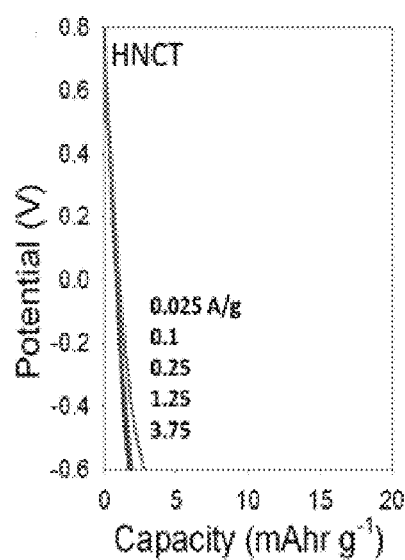
Figure 10D:
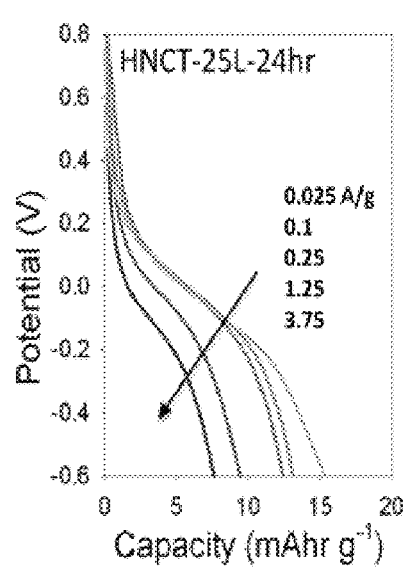

Symmetric supercapacitor devices were constructed with 1) HCNT electrodes and 2) polymer-modified nanocoil electrodes in a coin cell apparatus (MTI Corp) and on flexible substrates (Kapton tape assembly) using a glass microfiber membrane as the separator. Each component was first soaked in 1M $HClO_4$ under vacuum to saturate the electrodes. FIGS. 10A-D show the electrochemical properties of these devices. FIGS. 10A-B show the gravimetric capacitance vs voltage for pure HCNT and SLS-modified HCNT electrodes, respectively. Galvanostatic discharge plots are also shown in FIGS. 10C-D. A significant increase in both capacitance (~4.5 to ~40 F/g) and charge capacity (~3 to ~16 mAhr/g) were observed in these fully assembled supercapacitors.

Figure 11:
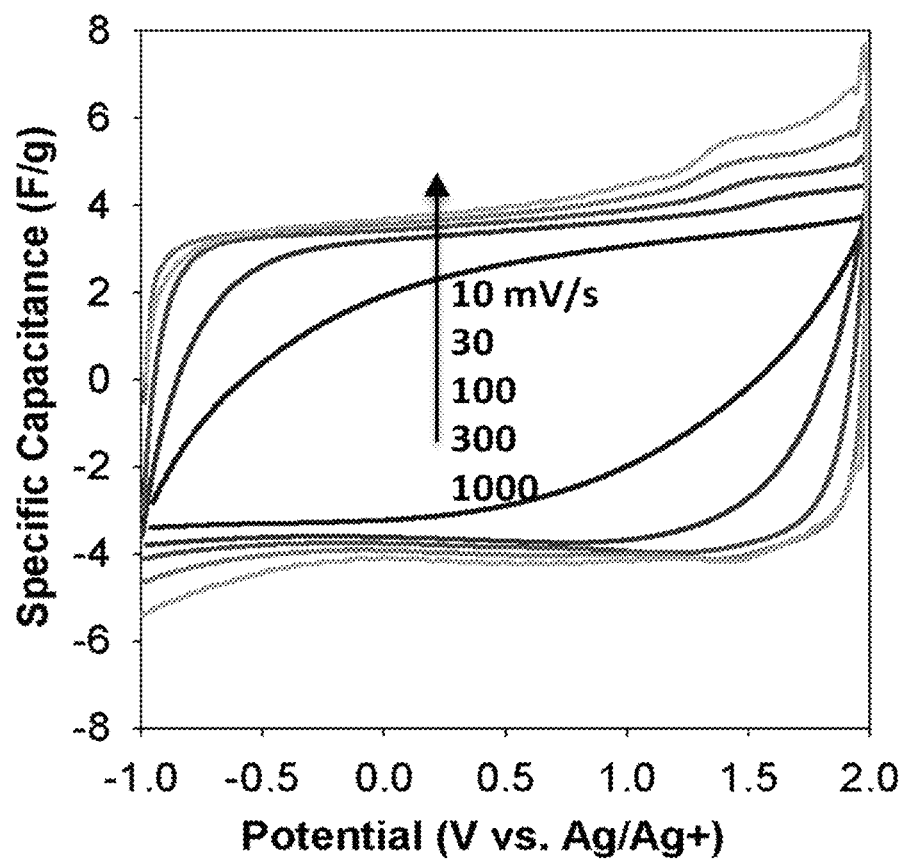
FIG. 11 illustrates the electrochemical performance (specific capacitance vs. voltage) of supercapacitors with symmetric electrodes comprising pure HCNT electrodes in 1M tetrabutylammonium tetrafluoroborate in propylene carbonate solutions. Curves are shown for scan rates ranging from 10 to 1000 mV/s.

Supercapacitors were also measured using pure HCNT electrodes in non-aqueous systems (1M tetrabutyl ammonium tetrafluoroborate in propylene carbonate). FIG. 11 shows the electrochemical properties of these devices for scan rates up to 1000 mV/s. Surprisingly, a comparable performance was observed in these systems compared to the acidic aqueous electrolyte.

In summary, carbon nanotube (MWCNT) and helically-coiled carbon nanotube (HCNT) paper electrodes were modified with an abundant redox biopolymer, sodium lignosulfonate, to increase the energy density of carbon-based capacitor electrodes. The carbon nanomaterial paper provides a conductive, high surface area, three-dimensional structure and the redox polymer provides increased charge storage through Faradaic charge transfer. The electrode platform demonstrated herein allows for the use of non-conductive redox polymers, which may have previously been dismissed for use in energy storage systems. Compared to pure carbon nanomaterial (HCNT) electrodes that exhibit specific capacitance values and charge capacities of 80 F/g and 20 mAhr/g, respectively, electrodes containing lignosulfonate-modified HCNT electrodes exhibit capacitance values and charge capacities of over 400 F/g and 80 mAhr/g, respectively.

As the cost of carbon nanotubes and nanocoil continues to decrease, such systems may find immediate use in low-cost energy storage devices. Importantly, the electrode fabrication process is scalable and can be applied to large format systems.

EXPERIMENTAL

Materials.

All materials were purchased from Aldrich and used as received unless otherwise noted. Concentrated sulfuric was obtained from Acros Organic. MWNT (props) were purchased from Cheap Tubes, Inc.

Preparation.

Pristine MWCNTs or as-prepared HCNTs (synthesized using chemical vapor deposition at Clemson University as in Refs. 1 and 2) were suspended in 1% aqueous solution of sodium dodecyl sulfate (SDS) or 0.3% lignin sodium sultanate (Na-Lignin or simply indicated as L) using a tip sonicator probe (1/8" diameter, Branson 250) for 15 minutes. Subsequently, the suspension was poured onto a polyamide filtration membrane (Whatman, 0.45 μm pore diameter) and filtrated using a vacuum filtration setup (Synthware Filtration Apparatus, Kemtech America). The filtered solute on the supporting filter membrane was washed with distilled water several times to remove the residual SDS, oven dried at ~60° C. for 8 hrs. The resulting film was peeled off the membrane to yield a freestanding buckypaper (BP) film. Several BP films with different thicknesses were prepared by varying the volume of the suspension and the concentration of MWCNTs.

Dry buckypaper substrates were submerged in the lignin solutions for various times. Next, films were removed from solution, rinsed copiously with DI water, and dried under vacuum at 80 C overnight.

Structural Analysis.

Thermal Gravimetric analysis (TGA) was performed on 1-2 mg samples in an alumina crucible over a temperature range of 25° C. to 800° C. at a rate of 40° C./min (TA Instruments, Q600 SDT). Scanning and Transmission Electron Microscopy (SEM and TEM) were performed using a Hitachi S4800 field-emission electron microscope and a Hitachi H7600 microscope.

Electrochemical Analysis.

Electrochemical properties were measured in 1M aqueous perchloric acid solutions (Princeton Applied Research VersaSTAT 4) using the modified buckypaper as the working electrode, an $Ag/Ag^+$ reference electrode and a Pt mesh counter electrode. Buckypaper was adhered in a Teflon cell with an exposed area of 0.5 $cm^2$ and contacted with Ti foil. Films were characterized using cyclic voltammetry (v=1, 0.3, 0.1, 0.03, 0.01, 0.003 V/s) over a potential range of −0.5 to 1.2 V, Galvanostatic cycling (i=30, 10, 5, 3, 2, 0.8, 0.2 mA) between −0.2 and 1.2 V, and electrical impedance spectroscopy over a frequency range of 10 kHz to 0.1 Hz (20 mV amplitude).

In regard to the discussion herein including the Examples above and the claims, it should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according based on how the value is determined, the measurement techniques, and the like. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composite, comprising:
    a carbon nanomaterial having an electrically non-conducting polymer coated on a portion of the carbon nanomaterial, wherein the electrically non-conducting polymer is selected from the group consisting of: a form of lignin, polyvinylquinone, polyvinylferrocene, a polyvinylene polymer containing pendant redox groups, and a combination thereof.

2. The composite of claim 1, wherein the carbon nanomaterial includes a plurality of carbon nanostructures.

3. The composite of claim 2, wherein the carbon nanomaterial is selected from the group consisting of: a mesoporous carbon, a carbon nanoparticle, a graphitic carbon, an activated carbon, a single walled carbon nanotube, a multi-walled carbon nanotube, a carbon nanowire, and a combination thereof.

4. The composite of claim 3, wherein the electrically non-conducting polymer coats about 1% to 100% of the surface area of the carbon nanomaterial.

5. The composite of claim 2, wherein the carbon nanostructure has a dimension of about 0.4 nm to 100 mm.

6. The composite of claim 2, wherein the carbon nanostructure has lateral dimensions of about 10 nm to 5 cm.

7. The composite of claim 1, wherein the carbon nanomaterial is a three dimensional porous structure.

8. The composite of claim 7, wherein the carbon nanostructure has a thickness of about 0.4 nm to 3 mm.

9. The composite of claim 1, wherein the carbon nanomaterial is chemically grown, coated, spread, or spray coated directly on a current collector, optionally in the presence of a binding material, with the electrically non-conducting polymer or monomer, wherein the current collector is selected from a group consisting of: copper, aluminum, nickel, iron, and a combination thereof.

10. A method of making a composite, comprising:
    chemically growing, coating, or spreading a carbon nanomaterial directly on a current collector, wherein the carbon nanomaterial includes an electrically non-conducting polymer coated on a portion of the carbon nanomaterial, wherein the electrically non-conducting polymer is selected from the group consisting of: a form of lignin, polyvinylquinone, polyvinylferrocene, a polyvinylene polymer containing pendant redox groups, and a combination thereof.

11. The method of claim 10, wherein the current collector is selected from a group consisting of: copper, aluminum, nickel, iron, and a combination thereof.

12. An energy storage device, comprising:
    at least one carbon nanomaterial having a an electrically non-conducting polymer coated on a portion of the carbon nanomaterial, wherein the electrically non-conducting polymer is selected from the group consisting of: a form of lignin, polyvinylquinone, polyvinylferrocene, a polyvinylene polymer containing pendant redox groups, and a combination thereof.

13. The energy storage device of claim 12, further comprising:
    a first electrode, a separator, and a second electrode, wherein a first carbon nanomaterial having a electrically non-conducting polymer is disposed between the first electrode and the separator and a second carbon nanomaterial is disposed between the second electrode and the separator.

14. The energy storage device of claim 12, wherein the current collector is selected from a group consisting of: copper, aluminum, nickel, iron, and a combination thereof.

15. The composite of claim 2, wherein the carbon nanomaterial is selected from the group consisting of: a helically coiled carbon nanostructure, a multiwalled helically coiled carbon nanostructure, and a combination thereof.

16. The method of claim 10, chemically growing, coating, or spreading includes spray coating the carbon nanomaterial directly on the current collector.

17. The method of claim 16, further comprising spray coating in the presence of a binding material with the electrically non-conducting polymer.

18. The method of claim 10, wherein the carbon nanomaterial is selected from the group consisting of: a helically coiled carbon nanostructure, a multiwalled helically coiled carbon nanostructure, and a combination thereof.

19. The method of claim 10, wherein the carbon nanomaterial is selected from the group consisting of: a mesoporous carbon, a carbon nanoparticle, a graphitic carbon, an activated carbon, a single walled carbon nanotube, a multi-walled carbon nanotube, a carbon nanowire, and a combination thereof.

20. The energy storage device of claim 12, wherein the carbon nanomaterial is selected from the group consisting of: a helically coiled carbon nanostructure, a multiwalled helically coiled carbon nanostructure, and a combination thereof.

21. The energy storage device of claim 12, wherein the carbon nanomaterial is selected from the group consisting of: a mesoporous carbon, a carbon nanoparticle, a graphitic carbon, an activated carbon, a single walled carbon nanotube, a multi-walled carbon nanotube, a carbon nanowire, and a combination thereof.

* * * * *